Sept. 15, 1936. W. J. HALL Re. 20,111
HINGE CONSTRUCTION
Original Filed Jan. 16, 1933
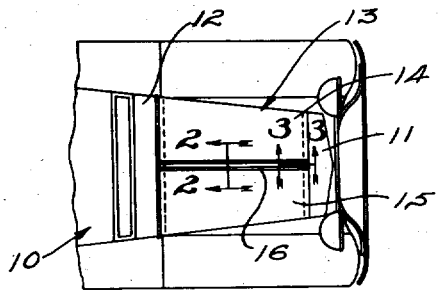
FIG. 1.
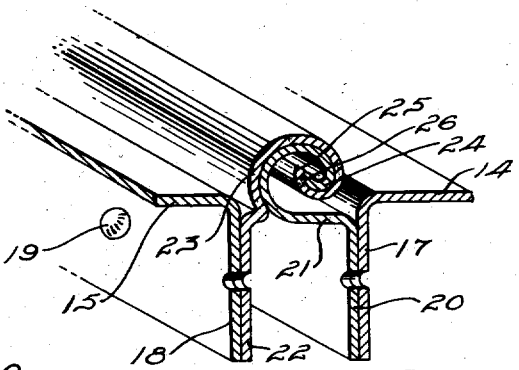
FIG. 2.
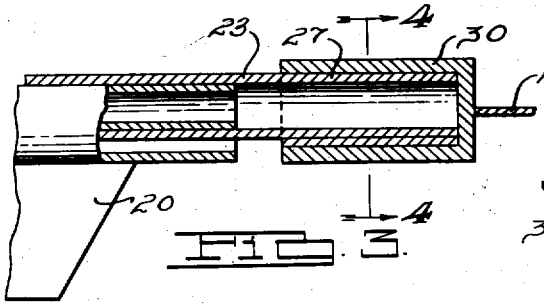
FIG. 3.
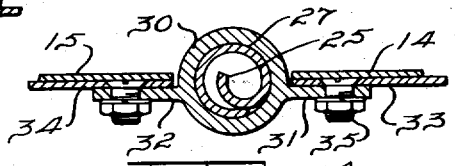
FIG. 4.
FIG. 5.
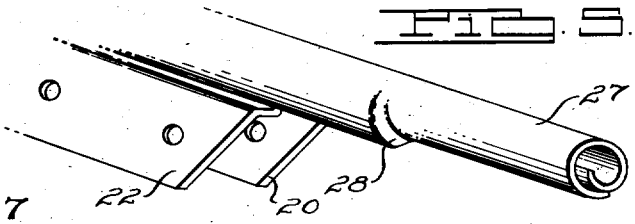
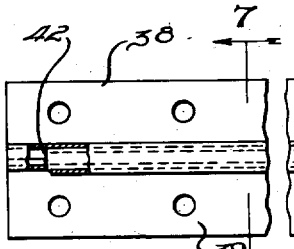
FIG. 6.
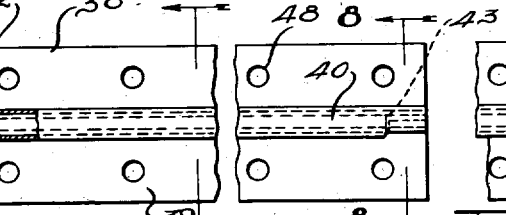
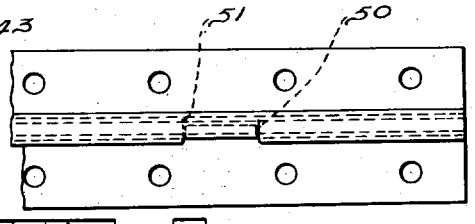
FIG. 9.
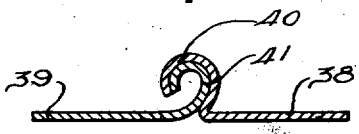
FIG. 7.
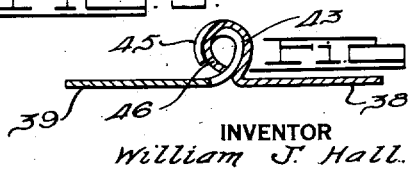
FIG. 8.
INVENTOR
William J. Hall.
BY
Harness, Dickey, Pierce & Hann.
ATTORNEYS.

Reissued Sept. 15, 1936

Re. 20,111

UNITED STATES PATENT OFFICE 20,111

HINGE CONSTRUCTION

William J. Hall, Detroit, Mich., assignor, by mesne assignments, of thirty per cent to Ollie L. Herron, thirty per cent to Joseph B. Zimmers, thirty-three per cent to William J. Hall, and seven per cent to R. C. Schemmel Original No. 1,987,775, dated January 15, 1935, Serial No. 651,939, January 16, 1933. Application for reissue May 23, 1935, Serial No. 23,057

8 Claims. (Cl. 16—178)

The invention relates to hinge constructions and it has a more particular relation to a hinge for the hood wings of motor vehicles.

In certain respects the invention relates to those disclosed in my prior patents relating particularly to hood constructions, Patent No. 1,987,774 Patent No. 1,912,635, and Patent No. 1,910,763.

Similarly to the patent last mentioned above, one object of the present invention is to provide a hood construction in which the wings of the hood are hinged directly together by co-acting rolled edges and hinged to the radiator and cowl of the vehicle without requiring the use of a supporting pivot or pintle connecting such parts of the vehicle.

Another object of the invention is to provide a hinge including turned beads on metal plates, nesting one within the other, wherein the ends of the outer bead project beyond the ends of the inner bead and serve as pintles for pivotally mounting the hinge on supports.

Another object of the invention is to provide a hinge for general use, comprising plates having turned beads one nesting within the other, wherein improved means are utilized for preventing relative axial movement of the plates so that any hinging member connected to one of the plates will be maintained in proper position longitudinally and with respect to the other plate.

Another object of the invention is to provide a hinge of the last mentioned character, wherein the means preventing relative axial movement of the plates, comprises projecting ends of one of the beads which additionally serve as pintles for the hinge.

Other objects of the invention will be apparent from the following description, the drawing relating thereto, and the claims hereinafter set forth.

For a better understanding of the invention, reference may be had to the accompanying drawing, forming a part of the specification wherein:

Fig. 1 is a fragmentary plan view of a vehicle having a hood construction designed according to one form of the invention;

Fig. 2 is a cross-sectional view on a larger scale taken substantially along the line 2—2 of Fig. 1;

Fig. 3 is a cross-sectional view on a larger scale taken substantially along the line 3—3 of Fig. 1;

Fig. 4 is a cross-sectional view taken substantially along the line 4—4 of Fig. 3.

Fig. 5 is an end perspective view of the hood hinge as seen when removed from the hood wings.

Fig. 6 is a fragmentary plan view partly in cross section, illustrating a hinge for general use which is constructed according to another form of the invention.

Fig. 7 is a cross-sectional view on a larger scale taken substantially along the line 7—7 of Fig. 6.

Fig. 8 is a cross-sectional view taken substantially along the line 8—8 of Fig. 6.

Fig. 9 is a fragmentary plan view of a hinge adapted for general use, and constructed according to another form of the invention.

Referring to Fig. 1, a motor vehicle is illustrated at 10, the radiator thereof at 11 and the cowl at 12. The hood is indicated at 13 and comprises oppositely disposed wings 14 and 15 hinged together at their meeting edges as indicated at 16.

Referring now particularly to Figure 2, the hood wing 14 is illustrated as having an inwardly turned flange 17 and the wing 15 similarly as having an inturned flange 18, such flanges being shown as spaced and substantially parallel when the wings are in closed position. The flange 17 may be rigidly connected by rivets 19, for example, to a similar flange 20 on a male hinge element 21 formed by rolling an edge of the element in the manner shown. The flange 18 on the hood wing 15 similarly is connected to the flange 22 of a female hinge element 23 adapted to cooperate with the male member 21, and in which the latter is nested. It is, of course, to be understood that the edges of the wings 14 and 15 may be rolled to provide the male and female hinge elements respectively, without manufacturing such elements separately, and then securing them to the wing, but ordinarily the first described manner of manufacturing will facilitate the metal rolling operations. The particular construction of the male and female elements has been illustrated and described in my co-pending applications for patents above identified, and accordingly, it does not seem necessary to explain them herein in detail. In many instances the male and female elements with their flanges 20 and 22, may constitute an article of manufacture to be subsequently connected to hood wings by the automobile manufacturer.

When the hinge parts are related, as shown in Fig. 2, it is apparent that the male and female members are so related that further closing movement of either hood wing is prevented. In opening either wing, as for example the wing 14, the hook portion of the male hinge element indicated at 24, finally hooks over the free edge of the female element indicated at 25, to provide a limit or stop to the opening movement. If the wing 15 is opened, the male and female members will move relatively in the same manner as when opening the wing 14, although in the one case, the male element will move while the female element will remain stationary, whereas in the other case, the male element will remain stationary and the female element will move. During this hinging movement of either wing the axis of hinging is substantially located at the point indicated at 26, although it will be appreciated that this axis may vary slightly during the movement of either wing. The hinge elements are associated by longitudinally telescoping them, and it will be appreciated that the construction from above, simulates the ordinary hood hinge wherein a long pintle or pin is employed, without necessitating the use of the latter. It is apparent that the male and female members are substantially continuous from the cowl to the radiator and hence that water or other matter may not enter the space below the hood through the hinge.

For pivoting the wings on the radiator and cowl, the female hinge element 23 extends beyond opposite ends of the male element as shown by Figures 3 and 5, and such projecting ends of the female element as shown best by Figures 4 and 5 are turned into substantially cylindrical portions indicated at 27. This operation results in the formation of a shoulder 28 on the female hinge element at each end of the male hinge element, and such shoulders serve to prevent relative axial movement of the elements and consequently relative axial movement of the hood wings to which they are secured. It will be appreciated that this deformation of the projecting ends of the female hinge element results in portions thereof extending transversely past the ends of the male hinge element so that after the parts are assembled and the ends are so deformed on the female element, movement of the male element therein in an axial direction is prevented. During the deformation operation, it is preferred to maintain the free edge 25 of the projecting end portions of the female element substantially in axial alignment with the free edge 25 between such deformed ends, and to maintain the free edge of the projecting portions substantially at the center of the cylindrical portions 27 thus provided.

Such projecting ends 27 on the female element are journaled in apertures in brackets 30 mounted on the radiator and cowl respectively. Each of the brackets 30 may have flanges 31 and 32 adapted to extend under portions 33 and 34 of the cowl and radiator, and bolts 35 may be utilized in securing the flanges to such portions of the vehicle. It will be noted as shown particularly by Fig. 4, that the hood wings 14 and 15 extend over the flanges 31 and 32 and portions 33 and 34 of the radiator and cowl, and along the pintle portions 27 of the female hinge element.

During movement of the hood wing 14, the pintle portions 27 of the female hinge element will remain substantially stationary in the brackets 30, although as stated in my patents referred to supra, upon this wing reaching its open position and the hook 24 engaging the free edge 25 of the female element, cushioning of the wing may be effected somewhat by the resiliency and give in the female element and slight turning thereof substantially about the axis 26 may occur. During opening of the hood wing 15, the portions 27 of the female element will rotate in the brackets 30, and it will be appreciated that the axis of hinging movement in this case as well as when the wing 14 is opened, substantially coincides with the axial center of the openings in the brackets.

The construction shown by Figures 6, 7 and 8 is adapted for general application and consists of two plates 38 and 39 having turned beads 40 and 41, as shown by Fig. 7. These turned edges are largely identical in construction to the arrangement shown by Figure 2 except that the hinge is inverted. The male hinge element 41 at its ends is removed substantially to the points indicated at 42 and 43, or in other words from these points to the ends of the hinge, the female hinge element extends beyond the ends of the male element. Substantially at each end of the male element, the female hinge element is cut as indicated at 45 in Fig. 8 and the projecting end portions of the latter circumferentially commensurate with the cuts are turned inwardly, as indicated at 46 to provide abutments at each end of the male element that prevent the latter from moving axially with respect to the female element. In use of a hinge of this character, the plate portions 38 and 39 may be secured to a frame and door respectively by means of screws or the like adapted to extend through openings 48, and during hinging movement of the door, the portion 46 at each end of the female element, in conjunction with the male element, transmits the vertical load on the hinge to that plate secured to the door frame. It will be appreciated that the portions 46 and the male member which engages them, permit a hinging movement without undue friction.

The construction shown by Fig. 9 is similar to that shown in Fig. 6, except that the male element is removed or eliminated at one or more points between the lines indicated at 50 and 51 and that the female element is cut at such lines similarly to the cutting indicated at 45 in Fig. 8, and then the portion of the female element between and commensurate circumferentially with the cuts is turned inwardly so that it fits between the adjacent ends of the male element. In other words, instead of having the turned in locking portion of the female element at the ends of the hinge as shown by Fig. 6, they are provided intermediate the ends of the hinge at one or more spaced points. It will be observed that with a hinge such as shown in Fig. 9, the turned in portions of the female member simulate to some extent the ordinary type of pintle hinge having eyes on two parts of the hinge for receiving the pintle.

It will be evident that an improvement in hood hinges has been provided which entirely eliminates use of the ordinary pintle, and that it comprises only two parts adapted to be secured to hood wings, although if desired, the hinge may constitute an integral part of the hood wings so as to eliminate the attaching flanges. It will be appreciated also that a hinge for general use has been provided involving plates having turned edges hingedly connected together, which is simple in construction, easily manufactured and efficient in its operation for hinging a door or the like, and vertically supporting it during its hinging movement.

Although more than one form of the invention has been illustrated and described in detail, it will be apparent to those skilled in the art that various modifications may be made without departing from the scope of the appended claims.

I claim:

1. A hinge comprising metal plates having turned beads at their adjacent edges, one nested within the other for hingedly connecting the plates, one of the beads at one end projecting beyond the end of the other bead, to provide a pintle portion for the hinge, and means for preventing relative axial movement of the beads.

2. In combination, spaced, apertured supports, metal plates having turned beads at adjacent edges, one nested within the other for hingedly connecting the plates, one of the beads having its ends projecting beyond the ends of the other bead and journaled at its ends in the apertures of the supports, and means independent of the supports for preventing relative axial movement of the beads.

3. In combination, spaced, apertured supports, metal plates having turned beads at adjacent edges, one nested within the other, for hingedly connecting the plates, the outer bead having its ends projecting beyond the ends of the inner bead and journaled at its ends in the apertures of the supports, and means on the outer bead and cooperating with the inner bead for preventing relative axial movement thereof.

4. In combination, spaced and apertured supports, metal plates having turned beads at adjacent edges, one nested within the other, for hingedly connecting the plates, the outer bead projecting beyond the ends of the inner bead and journaled at its ends in the apertures of the supports, said projecting ends being shaped to substantially fit in the apertures and having portions projecting transversely of the ends of the inner bead to prevent relative axial movement of the beads.

5. In combination, spaced apertured supports, metal plates having turned, generally spiral beads at adjacent edges, one nested within the other for hingedly connecting the plates, the outer bead projecting beyond the ends of the inner bead and having its projecting ends deformed to provide generally cylindrical outer surface portions journaled in the apertures of the supports.

6. In combination, spaced apertured supports, metal plates having turned beads at adjacent edges, one nested within the other for hingedly connecting the plates, one of the beads having its ends projecting beyond the ends of the other bead and journaled at its ends in the apertures of the supports, said projecting ends being deformed to provide portions projecting across the end faces of the other bead to limit relative axial movement of the beads in one direction.

7. A hinge comprising two plates having turned edges hingedly nesting one within the other, with one turned edge snugly and complementarily fitting within the other when the plates are turned into one position, said edges being so shaped that upon hinging movement of either plate, portions of the edges cooperatively engage to substantially prevent any lateral looseness in the hinge, one of the edges being substantially removed along a linear portion of the other edge and the latter portion of said other edge being turned into a smaller sector that extends across the end face of the first turned edge, the shape of the first turned edge at its end and the shape of the turned in sector of the other edge being such that during hinging movement of either plate, portions of the end face of the first turned edge and the end face of the turned in sector will constantly cross each other, from which it follows that said faces of the first turned edge and the turned in sector will at all times serve to provide a thrust bearing in the event axial forces tend to move the plates relatively.

8. A hinge comprising two plates having generally spiral, turned edges nesting one within the other and snugly and complementarily fitting one within the other when the plates are in one position, the inner ends of said edges terminating in curved portions fitting one within the other when the plates are in said position above mentioned, and the curved portion on the inner edge being adapted to hook over the end of the other edge when the plates are turned substantially away from the first position mentioned, one of said edges being removed along a linear portion of the other edge and said linear portion of the other edge being turned inwardly into a smaller sector, the end face of the sector and the end face of the first turned edge at the end of the sector cooperating to provide a thrust bearing stop to prevent relative axial movement of the plates and at the same time to take any thrust forces caused by one plate tending to move longitudinally of the other, said thrust face relation between the first turned edge and the sector being such that throughout turning movement of the plates relatively, the thrust bearing contact is obtained.

WILLIAM J. HALL.